(12) United States Patent
Kubacsi

(10) Patent No.: US 6,204,775 B1
(45) Date of Patent: *Mar. 20, 2001

(54) WIRELESS CONTROL AND/OR MEASURING SYSTEM FOR A CYCLE

(75) Inventor: Michel Kubacsi, Toussieux (FR)

(73) Assignee: Mavic S.A., Saint Trivier sur Moignans (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,161

(22) Filed: Nov. 6, 1997

(30) Foreign Application Priority Data

Nov. 7, 1996 (FR) .................................. 96 13849

(51) Int. Cl.⁷ ...................................... G08B 7/04
(52) U.S. Cl. ............................. 340/825.72; 340/825.69; 340/432
(58) Field of Search ........................ 340/825.72, 825.69, 340/432, 441, 462, 672, 670; 600/500, 509; 128/903; 324/168, 178, 179; 327/261, 231, 235, 269, 276

(56) References Cited

U.S. PATENT DOCUMENTS

| | | | |
|---|---|---|---|
| 4,550,387 | * 10/1985 | Takita | 364/900 |
| 4,625,733 | 12/1986 | Säynäjäkangas | 128/687 |
| 5,008,647 | 4/1991 | Brunt et al. | 340/432 |
| 5,056,107 | 10/1991 | Johnson et al. | 375/1 |
| 5,170,161 | 12/1992 | Sakurai | 340/870.3 |
| 5,177,432 | 1/1993 | Waterhouse et al. | 324/166 |
| 5,422,887 | 6/1995 | Diepstraten et al. | 370/85.3 |
| 5,534,808 | * 7/1996 | Takaki et al. | 327/261 |
| 5,553,094 | 9/1996 | Johnson et al. | 375/200 |

FOREIGN PATENT DOCUMENTS

| | | |
|---|---|---|
| 3508562 | 9/1986 | (DE) . |
| 4212321 | 10/1993 | (DE) . |
| 19537394 | 8/1996 | (DE) . |
| 0393427 | 10/1990 | (EP) . |
| 0402620 | 12/1990 | (EP) . |
| 0516113 | 12/1992 | (EP) . |
| 0558425 | 9/1993 | (EP) . |
| 2654698 | 5/1991 | (FR) . |
| 2674658 | 10/1992 | (FR) . |

OTHER PUBLICATIONS

Patent Abstracts of Japan, vol. 017, No. 253 (E–1367), published on May 19, 1993 (NEC Corp, et al.), of Japanese Patent Publication No. 04373287, published on Dec. 12, 1992.

* cited by examiner

Primary Examiner—Michael Tokar
Assistant Examiner—Jean Jeanglaude
(74) Attorney, Agent, or Firm—Greenblum & Bernstein, P.L.C.

(57) ABSTRACT

A wireless control and/or measuring system for a cycle. The system includes a transmitter of control and/or interrogation signals whose transmitted carrier frequency is between 10 and 150 kHz, i.e., within a range for which the human body is substantially transparent to the waves at this frequency. This signals transmitted by the transmitter are messages that include a code specific to the system. The transmitter is installed within reach of the cyclist, near the front; it is intended to transmit toward the rear at least one control and/or interrogation signal.

58 Claims, 3 Drawing Sheets

WIRELESS CONTROL AND/OR MEASURING SYSTEM FOR A CYCLE

BACKGROUND OF THE INVENTION

1. Field of the Invention

The invention relates to a system for the wireless transmission of signals for a cycle.

2. Description of Background and Relevant Information

In general, the operation of the main mechanisms of a bicycle, such as the derailleurs and the brakes, is controlled by mechanical devices. Most often, handles or levers are provided on the handlebar or the frame which are connected by cables to the corresponding mechanisms: front brake, rear brake, (front) derailleur for positioning the chain on a gear wheel and (rear) derailleur for positioning the chain on a sprocket wheel.

These operations demand the attention of the cyclist and sometimes require effort.

In order to eliminate these drawbacks, French Patent Publication No. 2 654 698 proposes a wireless remote control system with a transmitter installed on the handlebar which transmits signals to the brakes and to the derailleurs. The proposed system also comprises a display of the operating parameters.

The range of the transmitter is short, no more than two meters. However, the proposed technology has not yet proven suitable for practical embodiments, since it does not provide a solution to the essential problems to be solved for this type of system.

In particular, as mentioned in the aforementioned French patent, the transmitters and receivers must be in positions such that there is no transmission interference constituted by obstacles such as the cyclist himself. When the transmitter is disposed in the front, for example on the handlebar, and the receiver is in the rear, particularly in the area of the derailleurs or the brakes, it is not possible to produce this condition.

SUMMARY OF THE INVENTION

An object of the present invention is to eliminate the aforementioned drawback.

According to one of its aspects, the invention is directed to a wireless control and/or measuring system for a cycle or cycles, wherein it includes a transmitter of control and/or interrogation signals whose transmitted carrier frequency is within a range such that the human body is substantially transparent for this frequency and such that the signal transmitted is not very directive, and wherein the signals transmitted by the transmitter are messages comprising a code specific to the system.

The choice of signals for which the human body is transparent enables a control or interrogation device to be disposed in front of the cyclist and a receiver to be disposed behind the cyclist.

The low directivity of the signal allows a simple embodiment of the antennae, and the code specific to the system prevents the transmitter of one cycle from operating a mechanism, such as the derailleur, of another cycle travelling nearby.

In order to solve the latter problem (the non-operation of a mechanism of a nearby cycle), it is also possible to limit the range of the transmitter. However, it has been observed that this limitation is not enough to solve this problem, since this range is at least equal to the distance between the handlebar and the rear derailleur and, with this range, the receiver of a nearby cycle would inevitably receive a transmitted signal.

If the receiver of a cycle picks up a transmission originating from a transmitter of another cycle, this receiver will not cause an undesirable operation (or an undesirable measurement), since it will know how to recognize that the message is not intended for it.

In a preferred embodiment, the transmitter carrier frequency is between 10 and 150 kHz.

In this frequency range, the electromagnetic waves are practically undisturbed by the human body and by the frame of the cycle. Moreover, broadcasting signals have different frequency ranges. Finally, these frequencies provide a comfortable bandwidth for the transmission of digital messages between the transmitter and the receivers.

Given that in a wireless communication system it is practically inevitable that a receiver will pick up signals that are not intended for it, if the reception of an interfering signal occurs at the same time as the reception of a wanted signal, the latter signal runs the risk of not being correctly received. In this case, the corresponding command will not be executed. The interfering signal can originate from the same cycle or from another cycle.

In order to prevent interference of this type, the invention provides a means for detecting signals transmitted by other systems, and the transmitter begins transmitting its control signal only when no interfering signal is detected. The detection of interfering signals is carried out either in the vicinity of the transmitter or in the vicinity of the receiver or receivers.

In one embodiment, a means is provided such that the transmission of a signal is only carrier out after a determined time $T_E$ following a transmission command if, at the time of this command, an interfering signal is detected, the duration $T_E$ corresponding to a duration of a control signal transmission. With this disposition, the control signals, which cannot be transmitted simultaneously, are transmitted in the order of the time sequence of the transmission requests.

The duration of the transmission of each message being on the order of several milliseconds, in case of simultaneous transmissions, the delay between the control command initiated by the cyclist and the effective execution of the command will be at least around 100 ms, which is perfectly compatible with proper operation.

It is possible for the interfering signal to reach the receiver but not the transmitter. In this case, if there is no secondary transmitter coupled to the receiver for communicating with the main transmitter, the transmitter will not have any information on the interference. In order to solve this problem, in one embodiment, it is provided for each control message to be transmitted repeatedly, the duration that separates the transmission of two successive identical messages being random, for example equal to a whole number of message transmission times $T_E$. In this case, it is preferable for the repeated message to contain information on its rank, means being provided such that the repeated message is inoperative if the action commanded has already been performed as a result of the first message.

In one embodiment, each message or control signal is assigned an indication on the priority of its execution, for example, a braking command or a gear shift command takes priority over a reading of an operating parameter of the bicycle. In this case, the transmission of the priority signal enables the higher priority command to be transmitted before the other commands.

In a preferred embodiment of the invention, the modulation of the transmitted information, which is preferably digital, is a frequency modulation, which has the advantage of accepting a signal with a wide dynamic range, and thus of solving, in simple fashion, the problems of dispersions from one transmitter to another, power cell consumption, and different positions of the electronic components in a cycle. Moreover, this frequency modulation is not overly sensitive to interference.

According to another of its aspects, the invention relates to a wireless control and/or measuring system for a cycle which makes it possible to minimize electrical power consumption and thus maximizing the service life of the electric cells which supply power to the transmitters and receivers and minimizing their weight.

In order to solve this problem when the transmitter/receiver is not in use, either because the cycle itself is not in use or because the user is not using the control and/or interrogation functions, the invention provides for the de-activation of the receiver, with negligible power consumption, after the passage of a determined amount of time, for example on the order of several minutes, during which the receiver has not received a signal.

The de-activation consists of cutting off the power supply of the receiver and periodically re-establishing it, the duration of the supply of the power to the receiver being small relative to the duration of the shutoff. In one example, for each 5-second period the cutoff lasts 4950 milliseconds and the power supply lasts 50 milliseconds. The duration of the power supply is thus less than 1% of the duration of the shutoff.

In order to return the receiver to the continuous (power supply) listening mode, it is provided for the transmitter to send a signal with a duration at least equal to the period. This signal, or frame, has a format such that it can be picked up or detected by the receiver during the duration of its power supply, and the receiver comprises a means for placing itself in the listening mode following the receipt of this message. The frame transmitted constitutes a sort of switch for placing the receiver or receivers in the listening mode. Following the receipt of this message, the receiver remains in the listening mode (powered up) for a minimum duration, for example equal to on the order of several minutes.

The re-activation frame having a duration at least equal to the period is generated, for example, when a command such as a gear shift, is actuated.

Thus, when the cycle is not in use, it is not necessary to use a switch to minimize the consumption of the power cells, given that the de-activation is carried out automatically, and the restart is also carried out in simple fashion without any additional control mechanism.

The power consumption of the receivers in normal operation can also be reduced in a similar way by periodically shutting off the receiver. However, the period must be substantially shorter than in the preceding case so that the commands can be executed rapidly. For example, the period is 40 milliseconds, which enables a command to be executed in less than 100 milliseconds.

Thus, both in periods of non-utilization and periods of utilization, the electrical power consumption can be minimized by providing for a periodic shutoff of the receivers and the returning of the receiver to the listening mode through the transmission of a re-activation frame.

BRIEF DESCRIPTION OF DRAWINGS

Other characteristics and advantages of the invention will appear in the description of some of its embodiments, this description being given in reference to the appended drawings, in which.

DETAILED DESCRIPTION OF THE PREFERRED EMBODIMENTS

Figure 1:
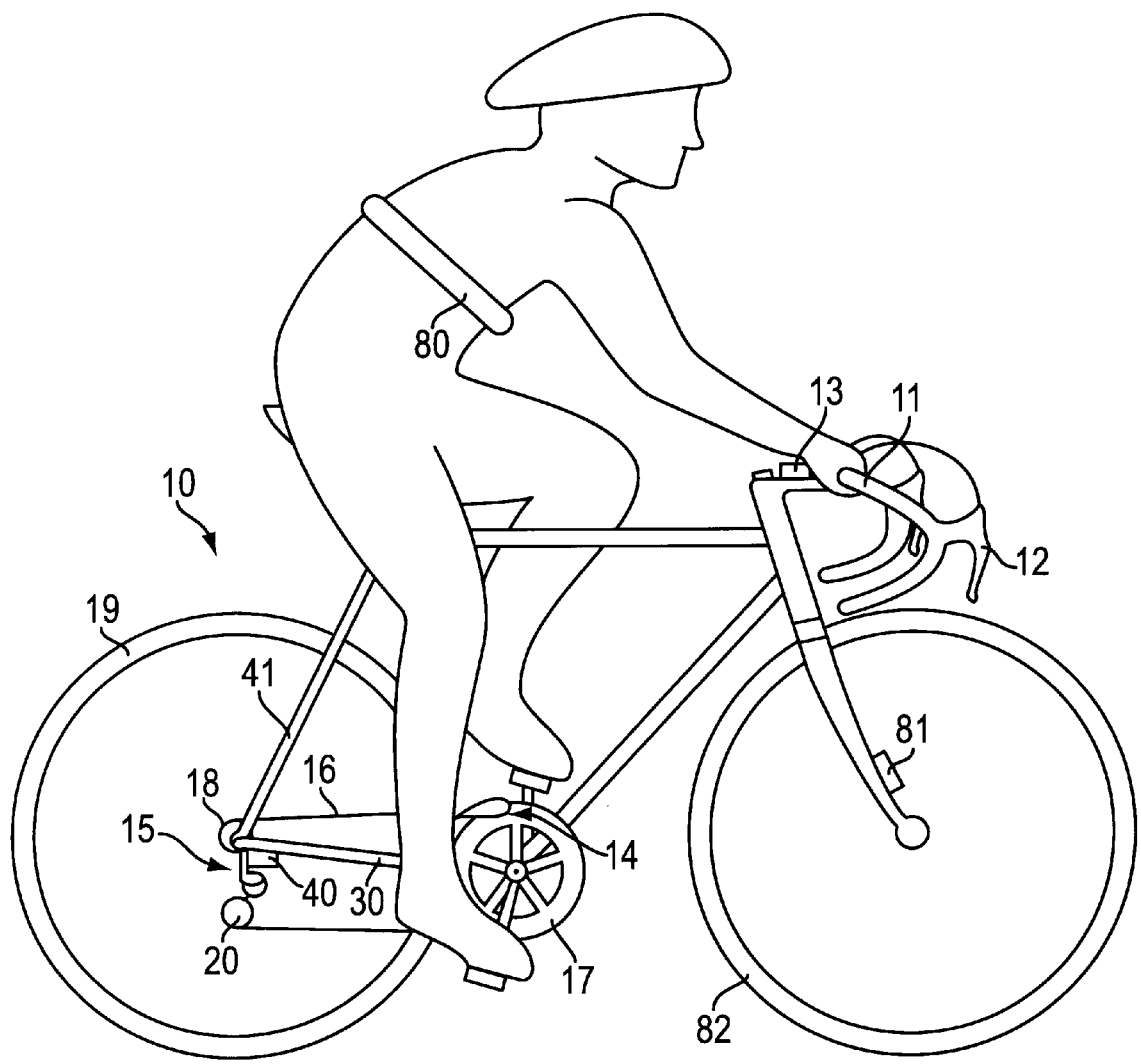
FIG. 1 shows a bicycle equipped with a system according to the invention.

The embodiment of the invention which will be described in connection with the figures related to a device for a bicycle. This bicycle 10 comprises, in standard fashion, a handlebar 11 on which are disposed all of the control mechanisms, that is, the brake handles 12 and the control 13 for the front derailleurs 14 and rear derailleurs 15. A brake handle on one side controls the operation of the pads on the front wheel, and the brake handle on the other side controls the operation of the pads on the rear wheel.

The front derailleur 14 comprises a fork for guiding the chain 16 which can be displaced laterally, that is, in a horizontal direction substantially perpendicular to the direction of travel of the cycle, so as to install this chain 16 on a selected gear wheel 17, the bicycle comprising, for example, three gear wheels of different diameters.

The rear derailleur 15 is also a mechanism for guiding the chain 16 which can be laterally displaced so that this chain engages with a selected sprocket 18, the cycle being equipped with several concentric sprockets of different diameters which are mounted on the hub of the rear wheel 19. This derailleur 15 also comprises spring-loaded return means 20 for keeping the chain 16 continuously taut.

In the example the rear derailleur 15 is the same type as the one described in European Patent No. 0 558 425, which will be referred to for greater precision.

In brief, this rear derailleur (FIG. 2) comprises a toothed wheel 21 which is driven in rotation by the chain 16 and which cooperates with an elongated element 22 that can be displayed along its axis 22a in an alternating motion, this rectilinear motion being caused by the rotation of the toothed wheel 21.

The elongated element 22 comprises, on each of its long sides, sockets (not shown) for receiving fingers 23 and 24. The fingers 23 and 24 can be displaced at right angles to the axis 22a. The displacement of these fingers 23 and 24 is caused by the feeding of electromagnets, respectively 26 and 27, and by spring-loaded return means (not shown). The axes of the fingers 23 and 24 have a fixed position relative to the frame 30 of the bicycle 10.

Figure 2:
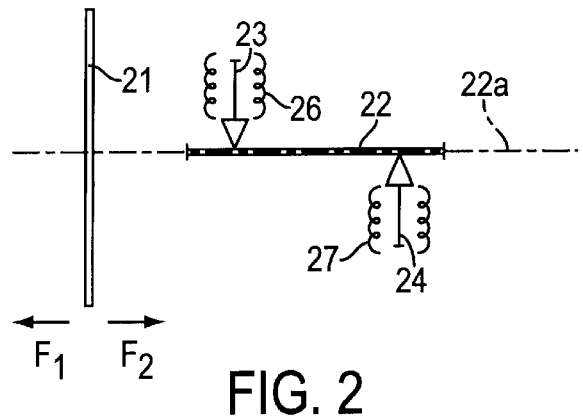
FIG. 2 is a diagram of a device for controlling the rear derailleur of the bicycle represented in FIG. 1.

The shape of the sockets which engages with the finger 23 is such that the element 22 is retained by the finger 23 when the stress exerted by the wheel 21 on the element 22 is exerted in one direction, which element 22 is not retained when the stress is exerted in the other direction. Consequently, the engagement of the finger 23 with a corresponding socket of the element 22 causes, in reaction, a displacement of the toothed wheel 21 in a determined direction, for example that of the arrow $F_1$ (FIG. 2).

The finger 24 engages with other sockets having shapes such that this engagement causes the lateral displacement of the wheel 21 in the opposite direction, that is, that of the arrow $F_2$ Thus, the operation of the finger 23 makes it possible to move the chain 16 to a sprocket of larger diameter and the operation of the finger 24 moves the chain 16 to a sprocket of smaller diameter.

The electrical feeding of the electromagnets 26 and 27 is controlled by buttons or similar devices on the handlebar. It is also possible to provide parallel switches so as to dispose the gear shift controls in several places on the handlebar.

In the aforementioned European Patent Publication 0 558 425, the electric cell for feeding the electromagnets 26 and 27 is integral with the handlebar, and wires are provided between the cell and the switches on the handlebar and the electromagnets.

The system according to the invention is the wireless type, meaning that it provides, within easy reach of the cyclist, on the handlebar in the example, a box 13 which sends a control signal to a receiving device 40 integral with the fork 41. The receiving device or receiver 40 decodes the signals originating from the box 13, and in accordance with the signals received, feeds the electromagnets 26 and 27.

The transmitter provided in the box 13 attached to the handlebar transmits to the device 40 in the vicinity of the axle of the rear wheel 19. The cyclist 42 (FIG. 3) is therefore located in the path of the waves 43 between the box 13 and the receiver 40. Thus, according to an important aspect of the invention, the electrical waves transmitted by the transmitter 13 are signals with a carrier frequency such that, for these frequencies, the human body 42 is transparent.

In the example, the carrier frequency chosen is between 10 kHz and 150 kHz. In order for the human body not to constitute an obstacle, it is possible, however, to choose a frequency lower than 10 kHz. But is preferable not to go below this value in order to provide a sufficient bandwidth, thus allowing the transmission of signals to be of sufficiently short duration.

The upper limit, approximately 150 kHz, is specifically imposed by legal constraints, the higher frequencies being reserved for particular transmissions.

Another advantage of these frequencies is that the electrical field generated weakens rapidly once it leaves the transmitter of the box 13. Thus, it is possible to limit the range of the transmitter so as to reduce the risk of interference from cycles equipped with an equivalent system travelling nearby. Therefore, the chosen range of the transmission signal is on the order of 1.5 to 2 meters.

Lastly, for this range of frequencies, the metal parts of the bicycle cause very little interference.

Figure 3:
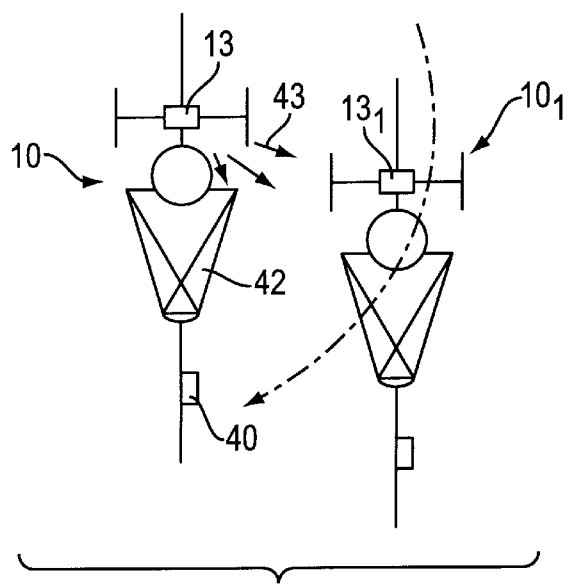
FIG. 3 is a diagram seen from above, showing two bicycles side by side, each of which is equipped with a system according to the invention.

However, for this range of frequencies between 10 and 150 kHz, the signal transmitted is not very directive. Thus, the transmitter 13 transmits in all directions and therefore in undesirable directions, particularly on the sides and toward the front, where other bicycles equipped with a similar system may be located. FIG. 3 shows that a nearby cycle $10_1$ runs the risk of being subjected to the electrical field originating from the transmitter 13. Likewise, the cycle 10 is subjected to the electrical field from the transmitter of the box $13_1$ of the cycle $10_1$.

According to another important aspect of the invention, means are provided such that the signal from the transmitter operates only the rear derailleur 15 of the cycle 10 and not the derailleur of another cycle, such as the cycle $10_1$.

More generally, means are provided such that the signal originating from the transmitter of the box 13, and intended for a peripheral receiving device (for operating a mechanism, or testing it or taking a measurement), is intended solely for this peripheral device on the same cycle.

To this end, the signals transmitted by the transmitter of the box 13 are of the digital type and comprise (FIG. 4) an initialization word 44, a word or code 45 specific to the system, that is, specific to the transmitter of the box 13, and a word 46 specific to the peripheral device in question, that is in this case specific to the receiver 40 for controlling the derailleur 15 of the cycle 10. Lastly, the message comprises a word 47 for the actual control of the derailleur. In standard fashion, other elements are provided, such as parity bits and/or specific codes, for limiting the risk of transmission errors.

Thus, a message transmitted by the transmitter of the box 13 neither does not interfere with any device on the cycle $10^1$ travelling nearby, nor does it interfere with other devices comprising a receiver on the same cycle 10.

Figure 4:
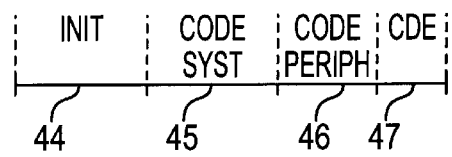
FIG. 4 is a diagram showing the structure of a message transmitted by the system according to the invention.

The structure of the messages described in relation to FIG. 4 makes it possible to avoid operating a mechanism in an undesired way. However, if two transmitters send messages simultaneously, the receiver, which will be subjected to two messages, will not be able to execute the message intended for it, since it will experience interference from the message that arrives at the same time.

Figure 5:
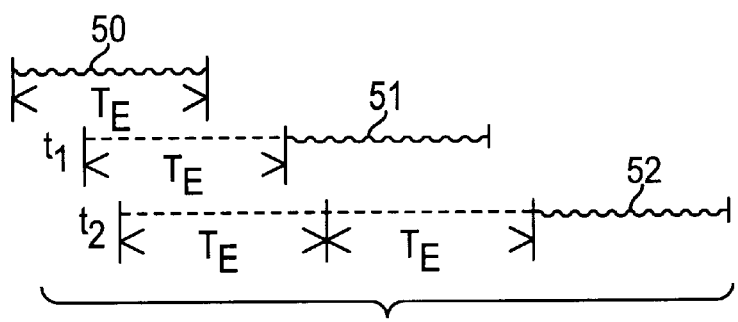
FIGS. 5, 6, and 7 are diagrams showing the properties of a system according to the invention.
Figure 6:
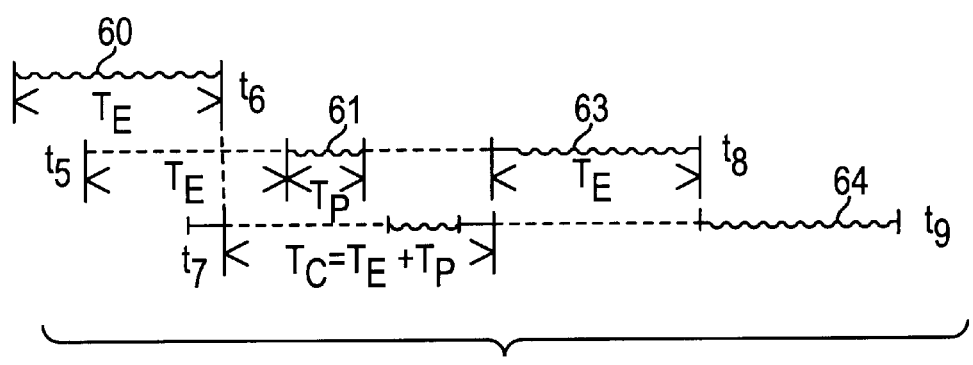

That is why means are provided to prevent two transmitters in proximity to one another from transmitting simultaneously (FIGS. 5 and 6).

Each box 13 comprises a detector (not shown) which makes it possible to determine, upon actuation of a button for commanding a transmission to the receiver 40, whether or not another transmitter, for example that of the box $13_1$ of the nearby cycle, is in the process of transmitting a message. If the detector of the box 13 does not receive any messages, the transmitter transmits the control message (FIG. 4) to the receiver 40.

On the other hand, if the detector of the box 13 determines that an interfering signal 50 is being transmitted (FIG. 5) at the moment $t_1$ at which the transmission of a message to the receiver 40 is commanded, this message is not transmitted immediately but is delayed by a duration $T_E$ equal to the duration of a message. This control message is then sent at the time $t_1+t_E$, on condition that at this instant, no other signal is received by the detector of the box 13. The delayed message has the reference number 51 in FIG. 5.

If, soon after the instant $t_1$ at which the transmission of a message is requested, another cyclist traveling nearby also transmits, at the time $t_2$, another command for transmitting a message, the detector of this other cyclist's system will determine, at the time $t_2+T_E$, the transmission of the signal 51. It is only after the passage of a new period $T_E$ that the transmission of the message 52 for the latter bicycle will begin, that is, at the time $t_2+2T_E$.

Since the time $T_E$ can be limited to a few milliseconds, these various command delays do not interfere in any way the operation of the derailleur or any other mechanism of the cycle.

Finally, each message is accepted in the order in which it was requested, which means that if the commands are executed in succession, it is the first request that will be executed first.

However, it can be necessary to give priority to certain messages. For example, a command for a speed display requested from the transmitter of the box 13, or from the transmitter of a nearby cycle, must be executed after a gear shift command or a braking command (if one exists).

In order to allow the priorities to be taken into account, each message is assigned a supplementary word or signal indicating whether or not the corresponding command is a priority command. Preferably, this word indicating priority precedes the control message, as shown in FIG. 6.

At the time $t_5$, a request to operate a derailleur is made. But at this moment, a nearby system transmits a message 60 with a duration $T_E$. In this case, at the end of a time $T_E$ (the duration of a control message), the operation request is automatically repeated—that is, without the cyclist's having to make a new request—and a digital signal 61 with a duration $T_P$ indicates a priority request.

The operation message 63 is then transmitted at the end of a time $T_C$ following the instant $t_6$ of the end of the transmission of the message 60 from the nearby system. The time $T_C$ is at least equal to $T_E+T_P$.

If a third cyclist, at the time $t_7$, gives a priority command, the corresponding message 64 will be transmitted immediately after the end of the transmission of the signal 63 at the instant $t_8$.

Likewise, if prior to the instant $t_6$, but after the instant $t_7$, another priority command request is transmitted, the corresponding message will be transmitted after the end of the transmission of the message 64 at the instant $t_9$.

Thus, the algorithm is the following: when a priority execution request is made by a cyclist, the detector associated with the transmitter determines whether or not a nearby message is in the process of being transmitted; if none is detected, it immediately transmits the message. If a signal 60 is detected, it transmits a priority signal 61 after the passage of a time $T_E$ (preferably at least equal to the duration of a control message) following the instant ($t_5$) of its first request; then, from the instant $t_6$ of the end of the transmission of the signal 60 until the transmission of its priority signal 61, it records the number n of priority signals transmitted by other systems. The message begins to be transmitted after the passage of a time $T_C+nT_E$ following the instant $t_6$ of the end of the message detected during its first request.

Since the receiver which has to execute a command (a gear shift in the example) is remote from the transmitter of the control message, it is possible for the receiver to be corrupted by a message from a nearby system while the detector associated with the corresponding transmitter is out of range of the corrupting transmitter. Under this circumstance, the algorithm described above in relation to FIG. 6 is ineffective since, in theory, it assumes that corrupting messages are detected at the level of the transmitter.

In order to solve this problem, each control message 70 (FIG. 7) is transmitted a second (71) after a time $NT_E$ followed the instant $t_{10}$ of the end of a first message 70. N is a random whole number that falls between values $N_1$, for example on the order of 5, and $N_2$, for example on the order of 20. The second message comprises a word (which can be reduced to 1 bit) indicating its rank (No. 2) so that if the command has been executed as a result of the first message, it is not executed a second time, each receiver being provided with means (not shown) for recording the execution of a command following the reception of a message.

In a variant, in order to solve this problem linked to the distance that separates the receiver from the transmitter, an acknowledgement transmitter (not shown) is associated with each receiver. This transmitter produces a signal indicating the execution of the command, which is intended for the detector associated with the main transmitter. If the command has been executed, as indicated by the acknowledgement signal, the transmitter will no transmit any new message. On the other hand, if no acknowledgement signal has been received at the end of a time $N_2T_E$ following the end of the transmission of the message, a second control message is transmitted. $N_2$ is a whole number, for example on the order of 20. This second message will contain (as in the embodiment described in relation to FIG. 7) a word or signal indicating its rank so that the command is not executed a second time if this command has already been executed in spite of the failure to detect an acknowledgement signal.

Figure 7:
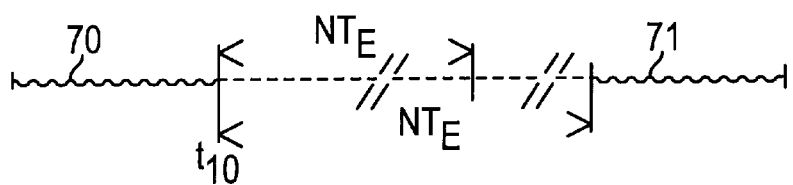

The layouts relative to the embodiment described in relation to FIG. 7 and its variant can be used either in combination with the layouts described in relation to FIG. 6, or independently.

Up to this point, a wireless transmitter and receiver system for controlling a rear gear shift (sprocket change) has been described. The invention also relates to a front gear shift (gear wheel change), to the control of the brakes (front and rear), and to the transmission of measurement signals. The measurement signals specifically include the speed, the power of the cyclist, and various physiological characteristics measured on the cyclist such as his heart rate, measured by means of a heart rate meter. The power generated by the cyclist is determined from the speed and the torque exerted on the rear hub. This torque can be detected by a device similar to that described in European Patent Publication No. 0 393 427.

The heart rate meter 80 (FIG. 1) is mounted on the cyclist's chest and is, for example, similar to that described in U.S. Pat. No. 4,625,733.

To measure the speed, a relay 81 subject to the influence of a magnet (not shown) is provided, attached to the front wheel 82.

In one embodiment, a system which transmits signals for controlling the operations (derailleurs, brakes) of the cycle is provided, which is separate from the system for analyzing measurement signals. In a variant, the system for controlling operation and measurement (and analysis) are combined, the same microprocessor being assigned to perform various functions.

The box 13 is impermeable. It is endowed with means (not shown) for fastening to the handlebar of the cycle. In a variant, a mounting means separate from the box, such as a clip, is provided.

Preferably, in addition to the gear shift control switches (not shown), a display device, particularly for a liquid crystal display, is provided. In one embodiment, this device displays information identifying the rear wheel sprocket with which the claim 16 is engaged. For example, each sprocket has a rank, the lowest rank corresponding to the largest diameter.

When the box 13 is intended to receive measurement parameters as well as to control mechanisms of the bicycle, the display device, in standard fashion, makes it possible to indicate normal parameters such as the current speed, the distance travelled since a start time, and the amount of time for which the cycle has been travelling. It is also possible to display the state of the power cells.

The transmitter-receiver provided in the box 13 comprises an oscillator, an amplifier and a ferrite antenna of the inductive type, as well as a microcontroller or microprocessor for controlling the derailleur, modulating/demodulating the transmitter-receiver, and controlling the display.

The box 40 attached to the rear derailleur also comprises a receiver-transmitter and a microcontroller or microprocessor as well as means for controlling the electromagnets.

The rear derailleur preferably comprises a cap beneath which the impermeable box 40 is disposed. This box is either integral with the cap or is connected to this cap so that it can be easily mounted, for example by means of guide rails and a clip.

When the electronic components of the box 13 incorporate a certain number of functions in addition to the functions for controlling the mechanisms of the cycle, such as the display of the speed, the power, or the physiological parameters of the cyclist, it is not necessary for all of the corresponding receivers to be permanently installed. In fact, the microprocessor can be programmed to periodically interrogate—automatically or on request—the various functions it must handle, the absence of a response indicating not a shutoff but a transition to the interrogation of another function.

Thus, the system according to the invention is a modular type. The purchaser of the control system can initially acquire the minimum configuration he desired and then add to his equipment.

Of course, the various electronic components of the system will be of reduced size and weight. For this reason, technologies of the "chip on board" type, for example, will be used.

The instant application is based upon French Priority Patent Application No. 96 13849, filed Nov. 7, 1996, the disclosure of which is hereby expressly incorporated by reference thereto, and the priority of which is hereby claimed under 35 USC 119.

What is claimed is:

1. A wireless control and/or measuring system for a cycle, comprising:
    a transmitter of one of cycle control and cycle interrogation signals for communicating with at least one receiver, the signals having a transmitted carrier frequency range between 10 and 100 kHz,
    wherein the signals transmitted by the transmitter are digital messages comprising a code specific to the system wherein the code specific to the system prevents another transmitter from causing an undesirable operation on the cycle.

2. The system of claim 1, wherein the transmitter is disposed on the cycle at a position that is within reach of a cyclist.

3. The system of claim 2, wherein the position is located in a front part of the cycle and wherein the transmitter transmits the signals towards a rear part of the cycle.

4. The system of claim 1, wherein the code specific to the system is a code specific to the receiver of the system.

5. The system of claim 1, wherein the transmitter comprises a transmission range which is limited to a distance on the order of 1.5 or 2 meters.

6. The system of claim 1, further comprising a device for measuring at least one parameter, wherein the at least one parameter comprises one of a speed of the cycle, a power generated, and at least one parameter linked to a cyclist.

7. The system of claim 1, further comprising a means for measuring the torque exerted on a wheel of the cycle, wherein the measurement is displayed on a display which is disposed near the transmitter.

8. The system of claim 1, further comprising a heart rate meter for measuring the heart rate of a cyclist, wherein the measurement is displayed on a display which is disposed near the transmitter.

9. The system of claim 1, further comprising a means for analyzing at least one parameter of the cycle or cyclist.

10. The system of claim 1, wherein the at least one receiver can periodically or alternately shut itself so as to place itself in a listening mode.

11. The system of claim 10, wherein a duration of the listening mode is short relative to a duration of a shutoff period.

12. The system of claim 1, wherein the signals transmitted by the transmitter are frequency modulated.

13. The system of claim 1, wherein the signals activate a mechanism on the cycle which mechanism comprises one of a front derailleur, a rear derailleur, a front brake, and a rear brake.

14. The system of claim 13, wherein each the front derailleur, the rear derailleur, the front brake, and the rear brake comprise a receiver which communicates with the transmitter.

15. The system of claim 11, wherein the at least one receiver comprises a means for continuous listening following the reception of a re-activation signal.

16. The system of claim 15, wherein the duration of the re-activation signal is at least equal to the duration of one period.

17. The system of claim 16, wherein the period comprises two values, the first of which corresponds to the non-utilization of the cycle, and the second of which is smaller and corresponds to the utilization of the cycle.

18. The system of claim 1, wherein the transmitter systematically produces two successive signals separated chronologically, the second signal comprising a signal identifying its rank in such a way that the receiver can recognize this rank so that the command is executed only once.

19. The system of claim 18, wherein the two successive signals are separated by a random duration ($NT_E$).

20. The system of claim 19, wherein the random duration is equal to a whole number (N) times the duration ($T_E$) of a signal, this whole number (N) being between two predetermined values ($N_1$ and $N_2$).

21. The system of claim 1, further comprising a means for assigning to the signals a signal indicating priority over other signals transmitted during substantially the same period.

22. The system of claim 21, wherein the priority signal is transmitted after an end ($t_6$) of a detection of a signal transmitted by a similar system.

23. The system of claim 21, wherein the signal indicating priority is transmitted with a delay ($T_E$) following an instant ($t_5$) of a request for transmission of a signal originating from a similar system, a duration ($T_E$) being at least equal to a duration of a control signal.

24. The system of claim 23, further comprising a means for counting the number of priority signals transmitted by similar systems between an end ($t_6$) of the detection of a signal transmitted by a similar system and a start of the transmission of its priority signal, the signal being transmitted by the system after the passage of a time ($T_C+nT_E$) following the end ($t_6$) of the detection of the signal, n being the number of priority signals detected and $T_C$ being a duration at least equal to the sum of the duration of a message ($T_E$) plus the duration ($T_P$) of a priority signal.

25. The system of claim 1, wherein the at least one receiver is associated with an acknowledgement transmitter for producing a signal indicating an execution of a command to the transmitter.

26. The system of claim 25, wherein the transmitter transmits a second signal at the end of a determined time after the transmitter determines that it has not received any acknowledgement from the at least on receiver.

27. The system of claim 26, wherein the second signal comprises a signal indicating its rank.

28. The system of claim 26, wherein the determined time is a period which is equal to a whole number times a duration of a signal.

29. The system of claim 1, further comprising a detector which detects messages transmitted by a similar system such that the transmitter transmits signals only if no other message is being transmitted simultaneously in a vicinity.

30. The system of claim 29, wherein the detector is disposed in proximity to the at least one receiver.

31. The system of claim 29, wherein the detector is disposed in proximity to the transmitter.

32. The system of claim 31, wherein each of the detector and the transmitter are disposed within a housing.

33. The system of claim 29, wherein the transmitter further comprises a means for delaying the transmission of a control or interrogation message by a determined duration ($T_E$) from the moment ($t_1$) of a command execution request when a message originating from a similar system is detected.

34. The system of claim 33, wherein the determined duration ($T_E$) is substantially equal to the duration of a control and/or interrogation message.

35. A wireless control and/or measuring system for a cycle, comprising:
   a transmitter of one of cycle control and cycle interrogation signals for communicating with at least one receiver, the signals having a transmitted carrier frequency range between 10 and 150 kHz; and
   at least one receiver for activating a device on the cycle,
   wherein the signals transmitted by the transmitter are digital messages comprising a code specific to the system wherein the code specific to the system prevents another transmitter from causing an undesirable operation on the cycle.

36. The system of claim 35, wherein the at least one receiver can determine a transmission which originates from another cycle so that the receiver does not cause the undesirable operation.

37. The system of claim 35, wherein the transmitter is adapted to transmit signals only when no interfering signals are detected by a detector.

38. The system of claim 35, further comprising a detector disposed adjacent one of the transmitter and the at least one receiver.

39. The system of claim 35, further comprising a secondary transmitter for communicating with the transmitter, the secondary transmitter being coupled to the at least one receiver.

40. The system of claim 35, wherein the signals activate a mechanism on the cycle, which mechanism comprises one of a front derailleur, a rear derailleur, a front brake, and a rear brake.

41. The system of claim 40, wherein each the front derailleur, the rear derailleur, the front brake, and the rear brake comprise a receiver which communicates with the transmitter.

42. The system of claim 35, further comprising a device for measuring at least one parameter, wherein the at least one parameter comprises one of a speed of the cycle, a power generated, and at least one parameter linked to a cyclist.

43. The system of claim 35, further comprising a mechanism for measuring the torque exerted on a wheel of the cycle, wherein the measurement is displayed on a display which is disposed near the transmitter.

44. The system of claim 35, further comprising at least one mechanism for analyzing at least one parameter of the cycle or cyclist.

45. The system of claim 35, wherein the at least one receiver can periodically or alternately shut itself off so as to place itself in a listening mode.

46. The system of claim 35, wherein the transmitter comprises a transmission range which is limited to a distance on the order of 1.5 or 2 meters.

47. The system of claim 35, wherein the code specific to the system is a code specific to the receiver of the system.

48. The system of claim 35, wherein the transmitter is disposed on the cycle at a position that is within reach of a cyclist.

49. The system of claim 48, wherein the position is located in a front part of the cycle and wherein the transmitter transmits the signals towards a rear part of the cycle.

50. The system of claim 35, further comprising a mechanism for detecting signals transmitted by other systems.

51. The system of claim 50, wherein the transmitter is adapted to transmit signals only when no interfering signals are detected.

52. A wireless control and/or measuring system for a cycle, comprising:
   a transmitter of cycle control and/or cycle interrogation signals having a transmitted carrier frequency range between 10 and 100 kHz, wherein the signals transmitted by the transmitter are digital messages comprising a code specific to the system,
   wherein the transmitter further comprises a detector that detects messages transmitted by a similar system such that the transmits signals only if no other message is being transmitted simultaneously in a vicinity.

53. The system of claim 52, wherein the detector is disposed in proximity to the at least one receiver.

54. The system of claim 52, wherein the detector is disposed in proximity to the transmitter.

55. The system of claim 52, wherein the transmitter further comprises a means for delaying the transmission of a control or interrogation message by a determined duration ($T_E$) from the moment ($t_1$) of a command execution request when a message originating from a similar system is detected.

56. The system of claim 55, wherein the determined duration ($T_E$) is substantially equal to the duration of a control and/or interrogation message.

57. A wireless control and/or measuring system for a cycle, comprising:
   a transmitter of one of cycle control and cycle interrogation signals for communicating with at least one receiver, the signals having a transmitted carrier frequency range between 10 and 150 kHz,
   wherein the signals transmitted by the transmitter are digital messages comprising a code specific to the system wherein the code specific to the system prevents another transmitter from causing an undesirable operation on the cycle.

58. A wireless control and/or measuring system for a cycle, comprising:
   a transmitter of one of cycle control and cycle interrogation signals for communicating with at least one receiver, the signals having a transmitted carrier frequency range between 10 and 150 kHz; and
   at least one receiver for activating a device on the cycle;
   the device comprising one of a brake and a derailleur,
   wherein the signals transmitted by the transmitter are digital messages comprising a code specific to the system wherein the code specific to the system prevents another transmitter from causing an undesirable operation on the cycle.

* * * * *